(12) United States Patent
Zhang et al.

(10) Patent No.: US 12,540,887 B2
(45) Date of Patent: Feb. 3, 2026

(54) TEST STRUCTURE AND TEST METHOD FOR IMPLEMENTING ON-SITE DRY-WET CYCLE OF LARGE-GRAIN-SIZE ROCK-SOIL BODY

(71) Applicant: Fujian Geological Engineering Survey Institute, Fuzhou (CN)

(72) Inventors: Zhichao Zhang, Fuzhou (CN); Xuefeng Tang, Fuzhou (CN); Kan Liu, Fuzhou (CN); Longzhen Ye, Fuzhou (CN); Chaoxu Guo, Fuzhou (CN); Yingying Huang, Fuzhou (CN)

(73) Assignee: Fujian Geological Engineering Survey Institute, Fuzhou (CN)

( * ) Notice: Subject to any disclaimer, the term of this patent is extended or adjusted under 35 U.S.C. 154(b) by 276 days.

(21) Appl. No.: 18/473,247

(22) Filed: Sep. 24, 2023

(65) Prior Publication Data
US 2024/0426723 A1    Dec. 26, 2024

(30) Foreign Application Priority Data

Jun. 25, 2023    (CN) .......................... 202310752559.9

(51) Int. Cl.
*G01N 3/24*    (2006.01)
*G01N 3/02*    (2006.01)
*G01N 5/04*    (2006.01)
*G01N 33/24*   (2006.01)

(52) U.S. Cl.
CPC ............... *G01N 3/24* (2013.01); *G01N 33/24* (2013.01)

(58) Field of Classification Search
CPC ............ G01N 3/24; G01N 1/286; G01N 3/32; G01N 3/02; G01N 33/24; G01N 3/12; G01N 15/082; G01N 1/28; G01N 3/08; G01N 3/60; G01N 15/0826; G01N 33/383; G01N 15/08; G01N 17/00; G01N 25/00; G01N 3/06; G01N 3/18; G01B 5/30; E02D 31/00; E02D 5/18; E02D 5/34; E02D 17/20; E01C 3/04; G06F 30/23
See application file for complete search history.

(56) References Cited

U.S. PATENT DOCUMENTS

| | | |
|---|---|---|
| 2021/0123841 A1 | 4/2021 | Hu et al. |
| 2021/0190672 A1 | 6/2021 | Zhang et al. |
| 2023/0253594 A1 | 8/2023 | Lee et al. |

FOREIGN PATENT DOCUMENTS

| | | | | |
|---|---|---|---|---|
| CN | 103884607 A | * | 6/2014 | |
| CN | 113970493 A | * | 1/2022 | ............... G01N 3/02 |

* cited by examiner

*Primary Examiner* — Brandi N Hopkins
(74) *Attorney, Agent, or Firm* — Zhigang Ma

(57) ABSTRACT

The present application relates to a test structure and a test method for implementing an on-site dry-wet cycle of a large-grain-size rock-soil body. The solution includes: a test site evenly paved with a test material; a test tank arranged in the test site, where two ends of each test tank in a width direction are separated from soil bodies of other test sites by steel plates, and each test tank is provided with a plurality of water permeable holes. The present application can implement an on-site dry-wet cycle test of a large-grain-size rock-soil body, and is suitable for engineering practice.

8 Claims, 7 Drawing Sheets

TEST STRUCTURE AND TEST METHOD FOR IMPLEMENTING ON-SITE DRY-WET CYCLE OF LARGE-GRAIN-SIZE ROCK-SOIL BODY

TECHNICAL FIELD

The present application relates to the technical field of civil engineering, and particularly relates to a test structure and a test method for implementing an on-site dry-wet cycle of a large-grain-size rock-soil body.

DESCRIPTION OF RELATED ART

In engineering construction, it has been the usual way to use a rock-soil body filler excavated on site for in-situ backfill. The physicochemical properties of the rock-soil body filler are affected by environmental factors of water, temperature, humidity, pressure, etc. A consensus of current research is that the rock-soil body filler is typically in a hard plastic or hard state with relatively desirable mechanical properties in its original condition, but after excavation, the filler is prone to water softening, weathering and disintegration after the long-term action of wind, sunlight and water, resulting in a decrease in shear strength parameters.

Generally, decrease in shear strength parameters of a rock-soil body filler under long-term working conditions can be simulated through a dry-wet cycle test, to obtain a "cycle number-strength" relation curve, so as to provide a more accurate and reasonable reference basis for engineering design. However, most previous studies have taken a sample back into a room for a dry-wet cycle process and an indoor geotechnical test. However, size effect of an indoor instrumentation limits the accurate study of a large-grain-size rock-soil body, and sampling causes the original properties of the in-situ rock-soil body such as rolling and dynamic compaction to change, which makes the dry-wet cycle simulation of a rock-soil body filler not accurate enough and the shear strength parameters distorted.

Therefore, to address the shortcomings in this regard, it is urgent to realize a test structure and a test method for implementing an on-site dry-wet cycle of a large-grain-size rock-soil body, so as to restore a real dry-wet cycle process of a rock-soil body filler more closely to the engineering practice and obtain a long-term strength parameter variation law of the filler more accurately.

SUMMARY

An objective of the present application is to solve the above problems in the prior art, and a test structure and a test method for implementing an on-site dry-wet cycle of a large-grain-size rock-soil body are provided.

A core point of the present application is that for the on-site dry-wet cycle of the large-grain-size rock-soil body, that is, a rock-soil body with a maximum grain size greater than 60 mm, cycle processes of on-site repeated drying (i.e., dewatering to a natural state) and wetting (i.e., soaking to a saturated state) are implemented on the rock-soil body, and then shear strength parameters of the rock-soil body under different numbers of dry-wet cycles are tested.

In order to achieve the above application objective, the present application uses the following technical solutions: a test structure for implementing an on-site dry-wet cycle of a large-grain-size rock-soil body is applied to an on-site dry-wet cycle test and a direct shear test of the rock-soil body with a maximum grain size greater than 60 mm, and includes:
  a test site evenly paved with a test material;
  a test tank arranged in the test site, where two ends of each test tank in a width direction are separated from soil bodies of other test sites by steel plates, and each test tank is provided with a plurality of water permeable holes;
  a spraying mechanism arranged on each test tank and configured to uniformly spray the test tank;
  a canopy erected above each test tank, where each canopy is provided with an air blower for blowing and drying the test tank;
  a shear box embedded into a soil body of each test tank under static pressure, where a top of each shear box is flush with a surface of the soil body of the test site, and a soil body around the shear box is hollowed out to form a concentric-square-shaped pit;
  a jack arranged on one lateral surface of each shear box and configured to apply a horizontal shear force, where a bearing steel plate is arranged at one end of the jack away from the shear box;
  a displacement meter arranged on the other lateral surface of each shear box with no jack mounted, and configured to measure displacement of the shear box;
  an acquisition instrument in communication connection with the jack and the displacement meter separately and configured to acquire the shearing force and the displacement;
  a counterweight arranged at a top of each shear box and used for counterweight;
  an oven configured to dry a sampled soil body; and
  a balance configured to measure the sampled soil body.

Further, the top of each shear box is provided with a steel base plate, and the steel base plate is configured to accommodate the counterweight.

Further, the steel plates are inserted into the test site by at least 50 cm and are at least 20 cm higher than the test site.

Further, the spraying mechanism includes a plurality of water hoses erected above all the test tanks, the water hoses are uniformly spaced in the width direction of the test tanks and parallel to the test tanks, and a plurality of nozzles are uniformly spaced in a length direction of each water hose.

Further, the water permeable holes are arranged on two sides of each water hose in a staggered manner.

Further, each shear box is a hollow box hollowed from top to bottom and having a bladed lower end.

Further, each shear box is placed on a center line of two adjacent water permeable holes on the left and right.

A test method for implementing an on-site dry-wet cycle of a large-grain-size rock-soil body includes:
  S00, laying out a site:
  transporting a large-grain-size test material to a test ground, and uniformly laying the material by means of an excavator, to form a test site, where a size of the site is determined according to the required number of experiments, such that the number of dry-wet cycle conditions corresponds to the number of test tanks;
  after the test ground is rolled to required compactness by a road roller, inserting a steel plate, to isolate each test tank in a length direction; and
  arranging a water hose on each test tank, connecting pipes, erecting a canopy above each test tank, and mounting an air blower on each canopy;
  S10, performing a basic physical property test on the rock-soil body:

sampling a rock-soil body of the test tank to be tested in the test ground; and weighing and drying the sampled rock-soil body, and weighing the dried rock-soil body again, to compute a saturated water content;

S20, implementing the on-site dry-wet cycle of the rock-soil body:

numbering each test tank, corresponding to the number of dry-wet cycles of each test tank in turn from small to large; and performing saturation-dewatering cycle operation on all the test tanks simultaneously, where in a test, a rock-soil body sample is saturated by means of sprinkler irrigation until all the rock-soil body samples are in a saturated state, and the rock-soil body samples are dewatered by means of natural air drying or accelerated air drying by an air blower;

S30, setting up an in-situ direct shear test environment:

embedding a shear box into the rock-soil body of each test tank under static pressure until the shear box completely enters the rock-soil body and is flush with an upper surface of the rock-soil body, where all the shear boxes are uniformly spaced in the length direction of the test tanks;

excavating a soil body around each shear box, to form a concentric-square-shaped pit by the shear box and the rock-soil body of the test tank;

trimming a surplus soil body off an upper portion of each shear box to keep the soil body flat, and covering a steel base plate;

arranging a jack on one lateral surface of each shear box in a left and right direction, and arranging a bearing steel plate at the other end of the jack;

arranging a counterweight at a top of each shear box; and arranging a displacement meter on a lateral surface opposite the lateral surface of each shear box with the jack mounted;

S40, performing an in-situ direct shear test:

acquiring data of the jacks and the displacement meters by means of an acquisition instrument, and forming a curve related to a shearing force and displacement;

keeping a shear rate constant, when shear deformation increases sharply or the amount of shear deformation reaches 1/10 of a size of a test body in each shear box, determining that the rock-soil body is damaged, stopping the test, and saving test data;

repeating the test, and mounting the counterweights with different weights, to obtain a plurality of groups of different vertical stress-shear stress distributions; and fitting a shear strength envelope of the rock-soil body according to the Mohr-Coulomb theory, so as to obtain a shear strength parameter; and S50, summing the shear strength parameters of all the shear boxes, to obtain a dry-wet cycle number-shear strength parameter relation curve with the number of dry-wet cycles as an abscissa and an shear strength index as an ordinate.

Further, in S10, specific steps of sampling are as follows:

S11, performing sampling by means of an annular sword, where a sampling position is located within 50 cm from edges of two sides of each test tank to the steel plate;

S12, vertically embedding the annular sword into the rock-soil body of each test tank by means of a compaction hammer to a soil sampling depth stably, and guaranteeing that a soil body below is not disturbed; and S13, taking out the annular sword stably with a pick, removing residual soil at two ends of the annular sword with a soil trimming knife, and wiping an outer wall of the annular sword, so as to obtain the sampled rock-soil body.

Further, in S20, a test point is set at every set distance in the length direction of each test tank, soil samples at a set depth from a surface are taken in real time every day, a water content is measured through a drying method, and when the water content reaches 80% of the saturated water content, the samples are saturated, a saturation process is ended, and water valves of the water hoses are closed to enter a dewatering process.

Compared with the prior art, the present application has the following beneficial effects that according to the present application, implementing a dry-wet cycle process on the large-grain-size rock-soil body on site is more suitable for engineering practice. Moreover, implementing the large-scale in-situ direct shear test can more accurately obtain a strength parameter variation law of the large-grain-size rock-soil body after different numbers of dry-wet cycles, and a larger sample size is more suitable for an actual situation. Real properties (for example, rolling, dynamic compaction, etc.) of a filler can be well preserved, and finally a "cycle number-shear strength" relation curve can be obtained, which can provide more accurate and reasonable reference basis for engineering design.

Figure 1:
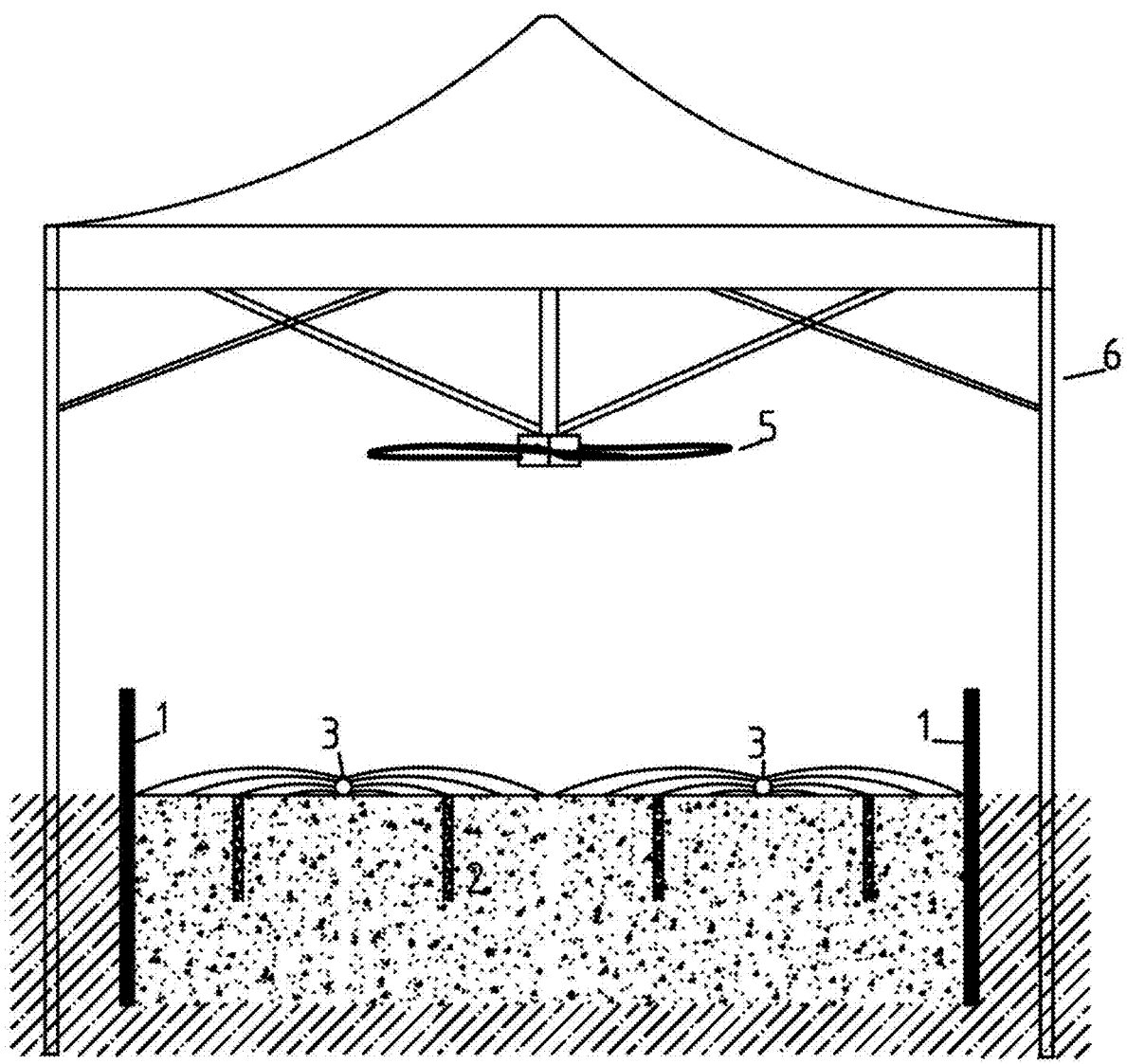
FIG. 1 is a sectional view of a dry-wet cycle test.

In the figures, 1. steel plate; 2. water permeable hole; 3. water hose; 4. water valve; 5. air blower; 6. canopy; 7. shear box; 8. jack; 9. bearing steel plate; 10. displacement meter; 11. cable; 12. counterweight; 13. steel base plate; and 14. test tank.

DESCRIPTION OF THE EMBODIMENTS

The technical solutions of embodiments of the present application will be described below clearly and comprehensively in conjunction with accompanying drawings of the embodiments of the present application. Apparently, the embodiments described are merely some embodiments rather than all of the embodiments of the present application. Based on the embodiments of the present application, all other embodiments obtained by those of ordinary skill in the art fall within the scope of protection of the present application.

It should be understood by those skill in the art that in the disclosure of the present application, the terms "longitudinal", "transverse", "upper", "lower", "front", "back", "left", "right", "vertical", "horizontal", "top", "bottom", "inner", "outer", etc. indicate azimuthal or positional relations based on those shown in the drawings only for ease of description of the present application and for simplicity of description, and are not intended to indicate or imply that the referenced device or element must have a particular orientation and be constructed and operative in a particular orientation, and thus these terms cannot be construed as a limitation on the present application.

Embodiment 1

As shown in FIGS. 1-5, a test structure for implementing an on-site dry-wet cycle of a large-grain-size rock-soil body is applied to an on-site dry-wet cycle test and a direct shear test of the rock-soil body with a maximum grain size greater than 60 mm, and includes:
- a test site evenly paved with a test material;
- a test tank 14 arranged in the test site, where two ends of each test tank 14 in a width direction are separated from soil bodies of other test sites by steel plates 1, each test tank 14 is provided with a plurality of water permeable holes 2, and
- the water permeable holes 2 are arranged on two sides of each water hose 3 in a staggered manner;
- a spraying mechanism arranged on each test tank 14 and configured to uniformly spray the test tank 14, where in the embodiment, the spraying mechanism includes the plurality of water hoses 3 erected above all the test tanks 14, the water hoses 3 are uniformly spaced in the width direction of the test tanks 14 and parallel to the test tanks 14, a plurality of nozzles are uniformly spaced in a length direction of each water hose 3, each nozzle is individually controlled to be turned on and off by a water valve 4, and the water valve 4 is an electromagnetic valve and is remotely controlled by wireless, such that a sprinkling irrigation amount can be accurately controlled;
- a canopy 6 erected above each test tank 14, where each canopy 6 is provided with an air blower 5 for blowing and drying the test tank 14;
- a shear box 7 embedded into a soil body of each test tank 14 under static pressure, where a top of each shear box 7 is flush with a surface of the soil body of the test site, and a soil body around the shear box 7 is hollowed out to form a concentric-square-shaped pit;
- a jack 8 arranged on one lateral surface of each shear box 7 and configured to apply a horizontal shear force, where a bearing steel plate 9 is arranged at one end of the jack 8 away from the shear box 7;
- a displacement meter 10 arranged on the other lateral surface of each shear box 7 with no jack 8 mounted, and configured to measure horizontal displacement of the shear box 7;
- an acquisition instrument in communication connection with the jack 8 and the displacement meter 10 separately and configured to acquire the shearing force and the displacement;
- a counterweight 12 arranged at a top of each shear box 7 and used for counterweight;
- an oven configured to dry a sampled soil body; and
- a balance configured to measure the sampled soil body.

Embodiment 2

Figure 6:
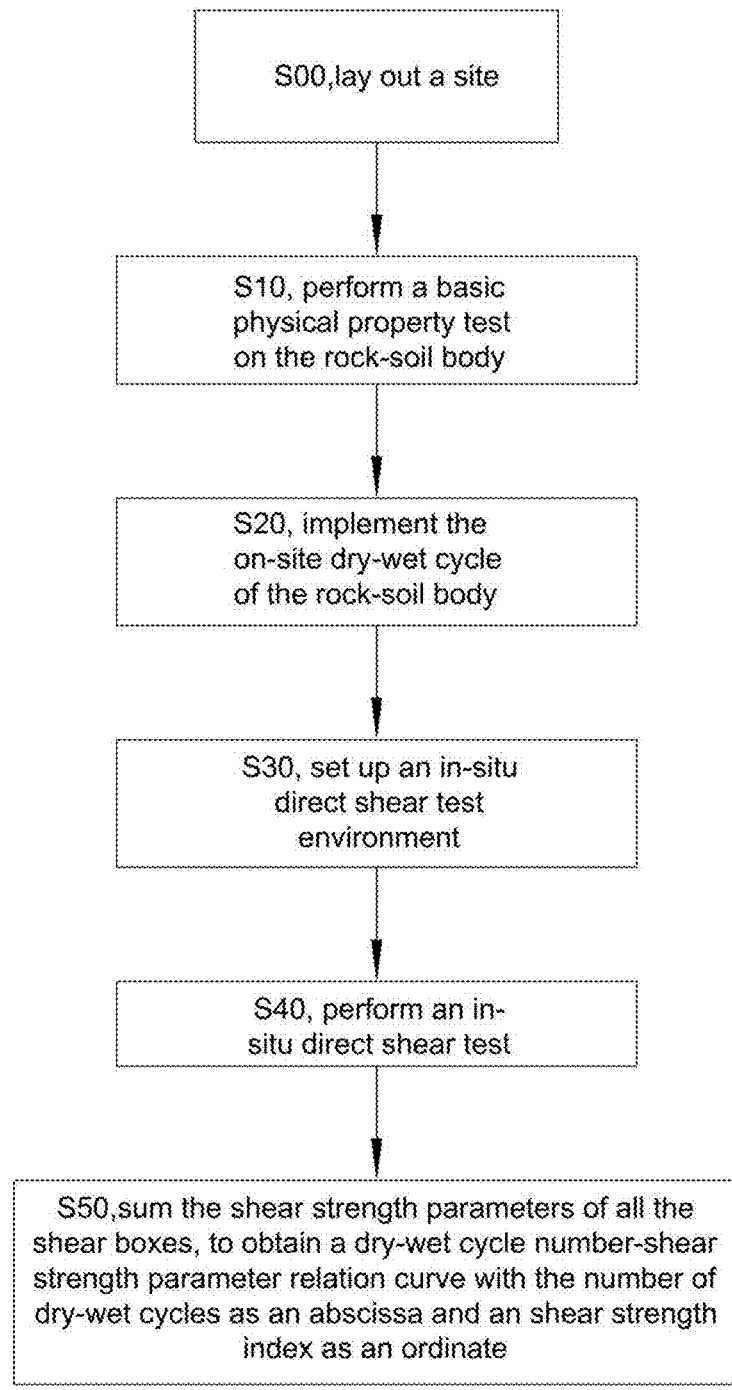
FIG. 6 is a flowchart of a test method of the present application.

As shown in FIG. 6, based on Embodiment 1, a test method for implementing an on-site dry-wet cycle of a large-grain-size rock-soil body are as follows:

S00, lay out a site:
- transport a large-grain-size test material to a test ground, and uniformly lay the material by means of an excavator, to form a test site, where a size of the site is determined according to the required number of experiments, such that the number of dry-wet cycle conditions corresponds to the number of test tanks 14;
- after the test ground is rolled to required compactness by a road roller, insert a steel plate 1, to isolate each test tank 14 in a length direction; and
- arrange a water hose 3 on each test tank 14, connect pipes, erect a canopy 6 above each test tank 14, and mount an air blower 5 on each canopy 6.

In the embodiment, it is estimated that a strength parameter of the rock-soil body after 10 dry-wet cycles attenuates to a basically stable value, and then the number of dry-wet cycles of each test tank 14 is set to be 1, 2, 3, 4, 5, 6, 7, 8, 9, 10 separately, and so on. Therefore, the number of the test tanks 14 is 10, each test tank 14 has a width greater than 2 m, and the test rock-soil body has a thickness greater than 50 cm. After the test ground is rolled to required compactness by a road roller, a steel plate 1 is inserted, to isolate each test tank 14 in a length direction. A depth of the steel plate 1 inserted into the soil body is greater than 50 cm, and the steel plate is higher than a surface of the rock-soil body by more than 20 cm, so as to guarantee that the dry-wet cycle process of each test tank 14 does not influence each other. Two water hoses 3 are connected to each test tank 14 for sprinkling irrigation, and the water hoses 3 may be disassembled at any time during the in-situ direct shear test without influencing the large-scale in-situ direct shear test.

S10, perform a basic physical property test on the rock-soil body:
- sample a rock-soil body of the test tank 14 to be tested in the test ground; and
- weigh and dry the sampled rock-soil body, and weigh the dried rock-soil body again, to compute a saturated water content.

In this embodiment, on-site sampling is performed by means of an annular sword on the paved site, and a sampling position is located within 50 cm from edges of two sides of each test tank 14 to the steel plate, so as to prevent the rock-soil body in the middle of the test tank 14 from being disturbed during sampling. Size parameters of the annular sword should comply with the provisions of the current national standard Primary Parameter and General Specification for Geotechnical Engineering Instrument GB/T15406 and the Instrument for Soil Test-Annular Sword SL370.

The annular sword is vertically embedded into the soil body by means of a compaction hammer to a soil sampling depth stably, and it is guaranteed that a soil body below is not disturbed. The annular sword is taken out stably with a pick, residual soil is removed from two ends with a soil trimming knife, and an outer wall of the annular sword is wiped. Mass of the soil sample is measured on a balance with accuracy of 0.01 g, the soil sample is placed in an oven and is dried for 8 hours, and then mass of a dried soil sample is measured. A natural unit weight, a natural water content and dry density are obtained.

A specific gravity of soil grains Gs is 2.7, and soil mechanics formulas in the following table are used:

| | |
|---|---|
| Natural unit weight | $\gamma = \dfrac{\omega_s}{V_s}$ |
| Dry unit weight | $\gamma_d = \dfrac{\omega_d}{V_s}$ |
| Water content | $\omega = \dfrac{\omega_s - \omega_d}{\omega_d}$ |

-continued

| Void ratio | $e = \dfrac{G_s \gamma_\omega}{\gamma_d} - 1$ |
|---|---|
| Saturation | $S_r = \dfrac{G_s \omega}{e} \times 100\%$ |

In the formulas: γ—an unit weight in a natural state;
ω$_s$—a weight of a natural soil sample;
V$_s$—a volume of the soil sample;
ω$_d$—a weight of a dry soil sample;
e—a void ratio, that is, a ratio of a sum of volumes of water and gas in the soil sample to a volume of the soil grains;
ω—a water content; and
S$_r$—saturation.

The void ratio e and the saturation S$_r$ in the above formulas are derived from basic formulas. First, a water content when the saturation of the soil sample is 100%, that is, the saturated water content, is computed. During a subsequent dry-wet cycle in S20, when an actual water content measured by sampling reaches 80% of the saturated water content, it can be regarded as reaching a saturated state. When dewatering is performed to a natural water content, it can be regarded as completing dewatering.

S20, implement the on-site dry-wet cycle of the rock-soil body:
  number each test tank 14, corresponding to the number of dry-wet cycles of each test tank 14 in turn from small to large; and
  perform saturation-dewatering cycle operation on all the test tanks 14 simultaneously, where
  in a test, a rock-soil body sample is saturated by means of sprinkler irrigation until all the rock-soil body samples are in a saturated state, and the rock-soil body samples are dewatered by means of natural air drying or accelerated air drying by an air blower 5.

In the embodiment, a valve is arranged at an end of each test tank 14 or a valve is arranged on each nozzle. The water hose 3 is connected to the valve, water outlet holes are uniformly provided around the water hose 3 at intervals of 50 cm, and the soil body around the water hose can be sprayed and irrigated under the action of water pressure. Two water hoses 3 are arranged on each test tank 14. The valves are turned on to discharge water simultaneously until the samples are all in a saturated state. In a saturating process, the soil is sampled every day to detect the saturation. After the saturated state is reached, the valves are turned off for dewatering. In a dewatering process, the soil is sampled every day to detect a dewatering degree. Until the water content reaches the natural water content, a second saturation-dewatering cycle is performed. After a test tank 14 completes the specified number of dry-wet cycles, the large-scale in-situ direct shear test can be started, and other test tanks 14 can keep undergoing dry-wet cycles.

The dry-wet cycle is divided into a saturation process and a dewatering process.

Figure 2:
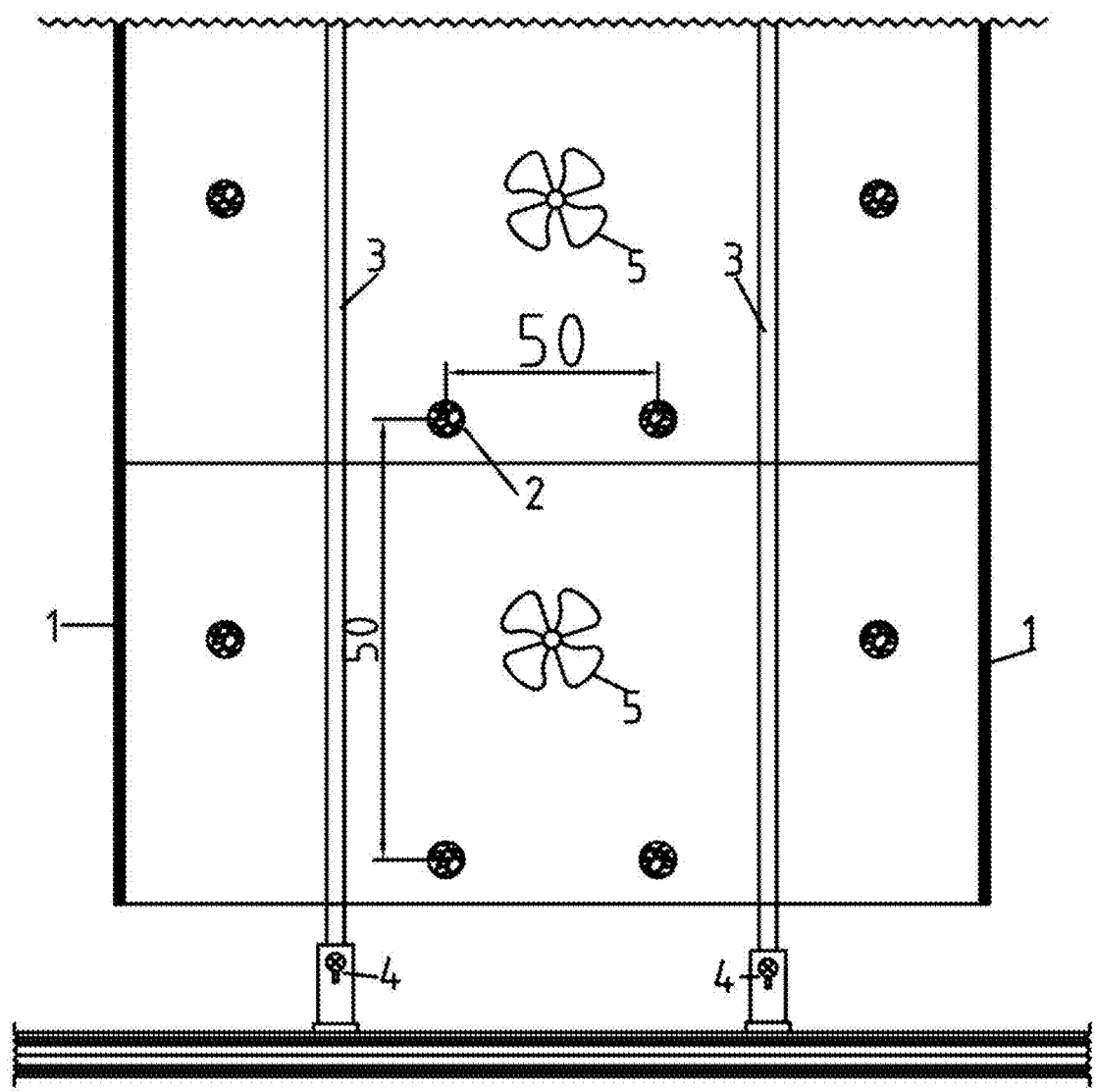
FIG. 2 is a layout diagram of water pipes and water permeable holes.
Figure 3:
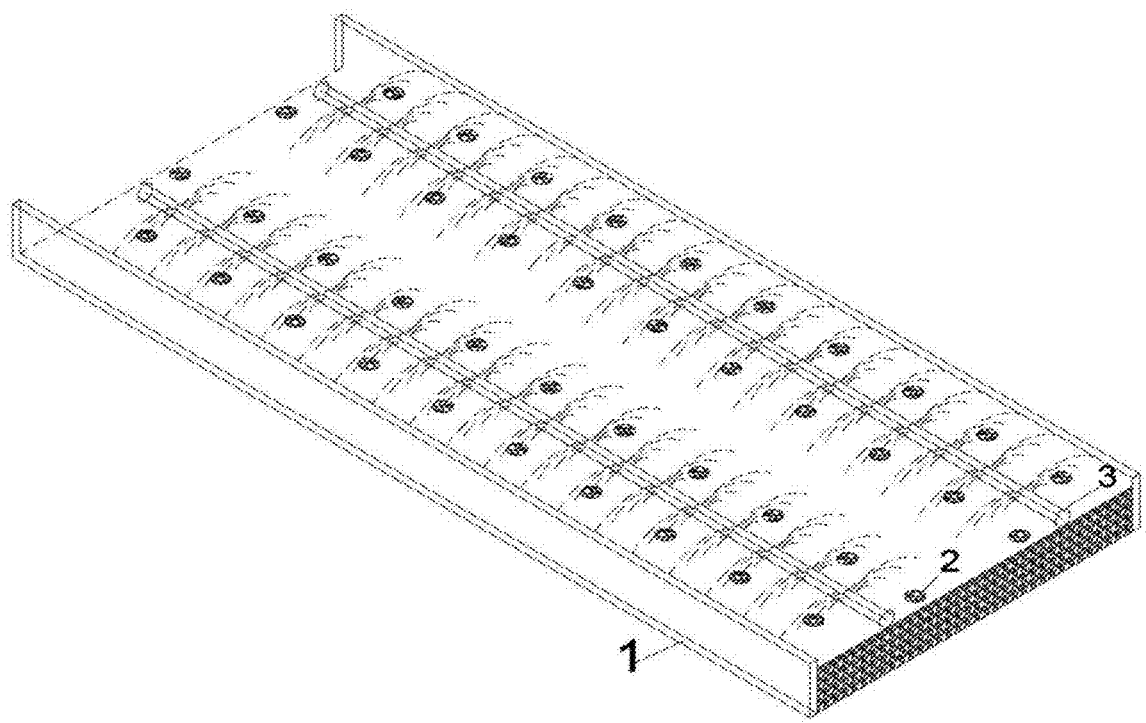
FIG. 3 is a sprinkler irrigation diagram of water hoses.

The saturation process is to turn on the water inlet valves 4, to make the water hoses 3 spray for irrigation under water pressure. A plurality of water permeable holes 2 with a depth greater than 25 cm are set in the test tanks 14, and the water permeable holes 2 are filled with gravel and sand, to maintain desirable water permeability. The water permeable holes 2 are provided with a hexagonal shape (as shown in FIG. 2). A test point is set at every 2 m in the length direction of each test tank 14, soil samples at a 25 cm from a surface are taken in real time every day, a water content is measured through a drying method, when the water content reaches 80% of the saturated water content, the samples are saturated, a saturation process is ended, and water valves 4 are closed to enter a dewatering process.

The dewatering process is to measure the water content every day when the sample is dewatered, and stop measuring until the water content reaches the natural water content. Since the site is arranged on an outdoor ground, the natural water content is reached by natural air drying in the dewatering process. In order to prevent a weather influence, rainproof facilities should be arranged, a canopy 6 is required to completely cover the site, and an air blower 5 may be arranged in the canopy 6 in rainy days, to accelerate air drying of the soil body. The air blowers 5 are arranged in the canopy 6 at intervals of 3 m-5 m in the length direction.

S30, set up an in-situ direct shear test environment:
  embed a shear box 7 into the rock-soil body of each test tank 14 under static pressure until the shear box 7 completely enters the rock-soil body and is flush with an upper surface of the rock-soil body, where all the shear boxes 7 are uniformly spaced in the length direction of the test tanks 14;
  excavate a soil body around each shear box 7, to form a concentric-square-shaped pit by the shear box 7 and the rock-soil body of the test tank 14;
  trim a surplus soil body off an upper portion of each shear box 7 to keep the soil body flat, and cover a steel base plate;
  arrange a jack 8 on one lateral surface of each shear box 7 in a left and right direction, and arrange a bearing steel plate 9 at the other end of the jack 8;
  arrange a counterweight 12 at a top of each shear box 7; and
  arrange a displacement meter 10 on a lateral surface opposite the lateral surface of each shear box 7 with the jack 8 mounted.

Figure 4:
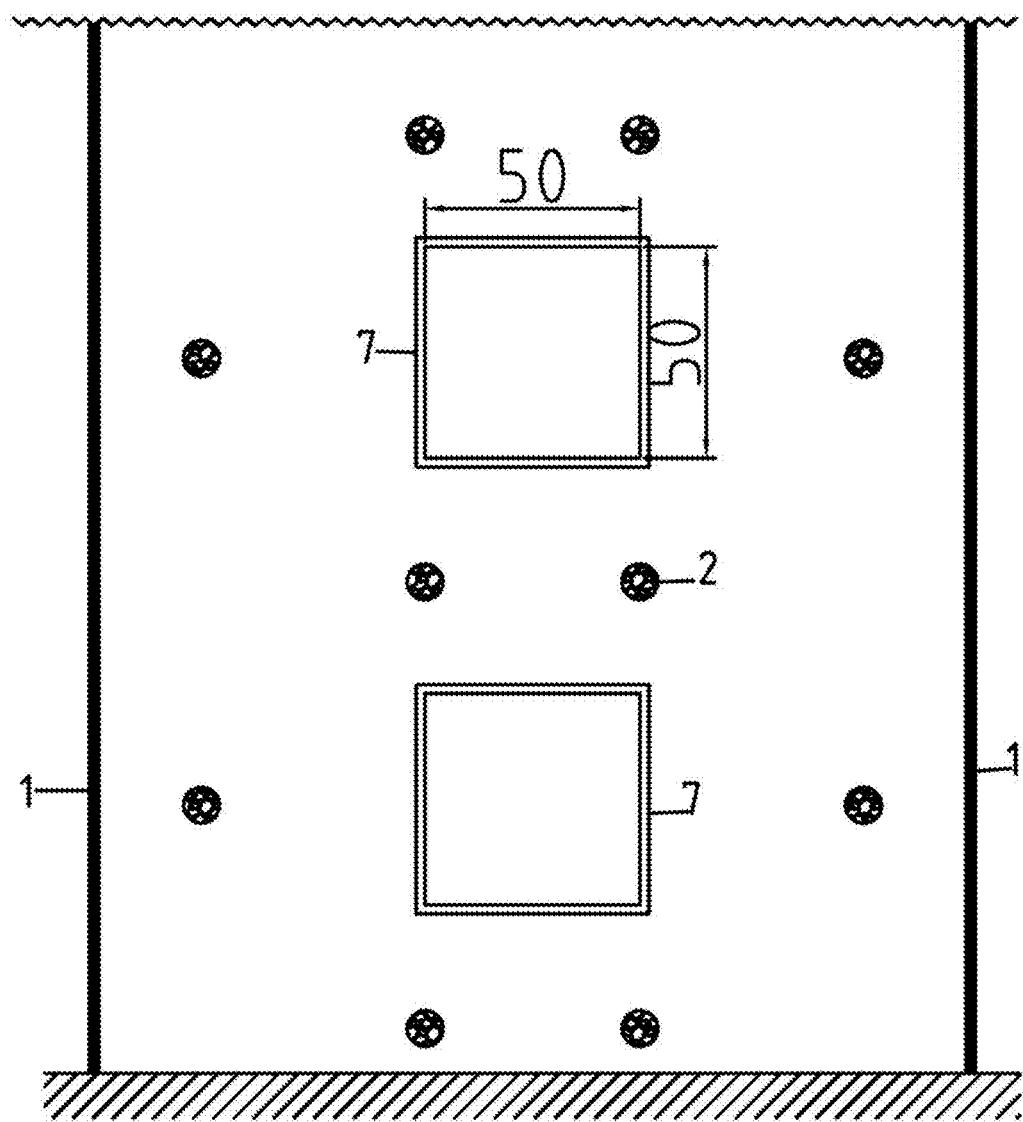
FIG. 4 shows an arrangement of shear boxes.
Figure 5:
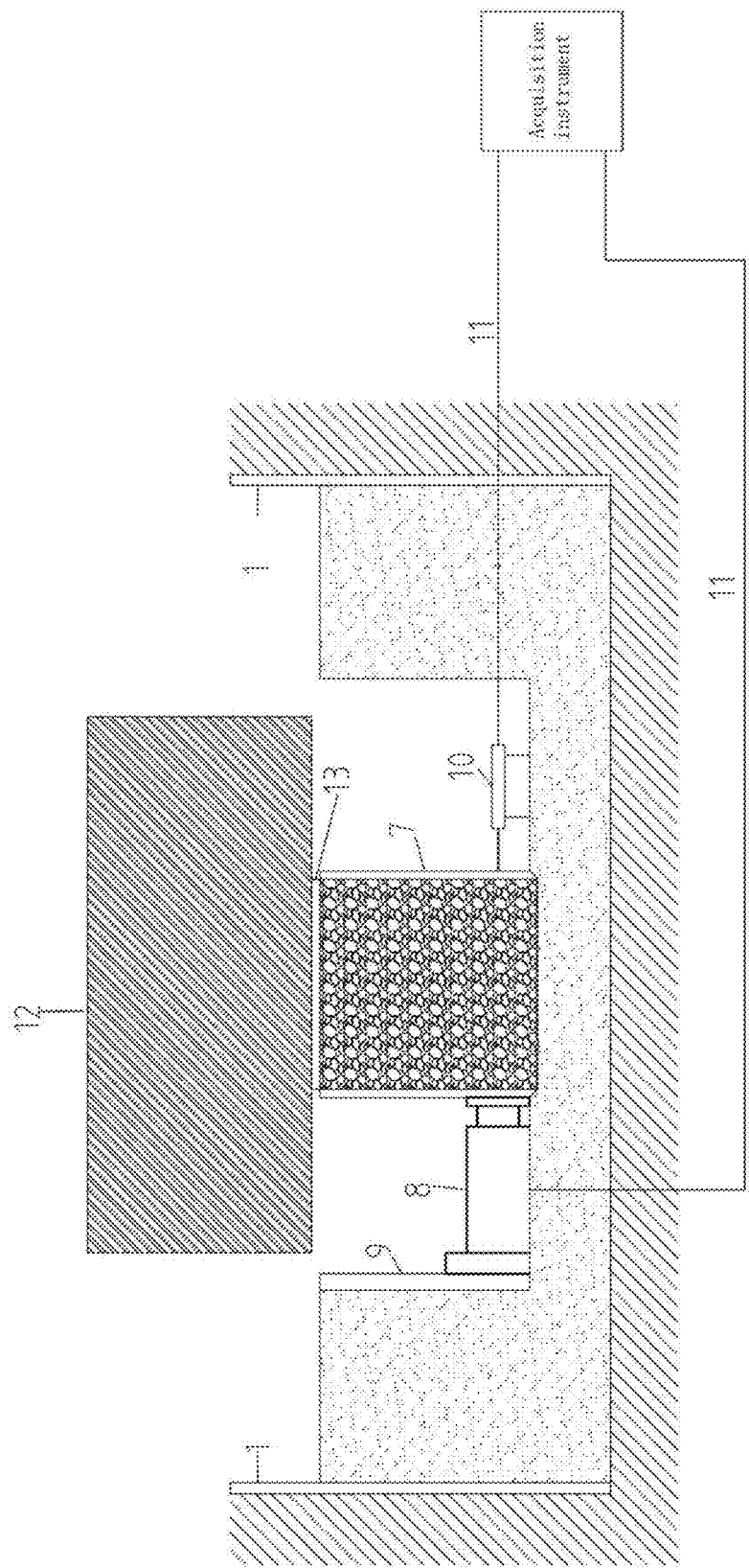
FIG. 5 is a sectional view of a large-scale in-situ direct shear test.

In the embodiment, it can be summarized as that a sample is prepared: when an established dry-wet cycle process is completed, a large-scale in-situ direct shear test may be performed. Firstly, each shear box 7 with an internal size of 50 cm*50 cm*25 cm is embedded into the soil body under static pressure until the shear box 7 completely enters the soil body and is flush with a surface of the soil body. Then a rock-soil body around the shear box 7 is excavated and removed, the rock-soil body is processed into a block sample with a specification of 50 cm*50 cm*25 cm, and the surplus soil body at the upper portion of the shear box 7 is trimmed off by a soil trimming knife, to keep the upper portion flat. Then the steel base plate 13 covers the upper portion of the shear box, to facilitate application of a normal load, and the steel base plate 13 matches the shear box 7 in size and has a size of 50 cm*50 cm. Each shear box 7 has an internal size of 50 cm*50 cm*25 cm. The shear box 7 is a hollow box hollowed from top to bottom and having a bladed lower end. A shear position of the shear box 7 is located in a distribution center of the water permeable holes 2 (as shown in FIG. 4). A distance between the shear boxes 7 in each large-scale in-situ direct shear test is 50 cm.

A shear load system is arranged: a hydraulic jack 8 and a bearing steel plate 9 are mounted in sequence in the horizontal direction, the jack 8 provides a shear force for the shear box 7, and the bearing steel plate 9 provides a shear reaction force. The jack 8 moves the shear box 7 slowly in the horizontal direction by means of pressurization of a hydraulic pump. A shear direction is consistent with a preset thrust direction. A projection of the shear box should pass through a center of a preset shear plane. An axis of action of a shear load should be parallel to the preset shear plane, and a distance between a force point and the shear plane should not be greater than 5% of a length of the test sample in the shear direction.

A normal load system is arranged: the normal load system is arranged after a horizontal stressing mechanism is arranged, and the steel base plate 13 covers the shear box 7, such that the soil body in the shear box 7 is uniformly subjected to a normal force, to avoid an eccentric phenomenon during loading. The normal force is applied in a stacking manner. The counterweights 12 are counterweights 12 with different weights and placed on the steel base plates 13 on the shear boxes 7. For each counterweight 12, a weight of the counterweight 12 is divided by an area of a top surface of the shear box 7 as a vertical stress. The mass of the counterweights 12 is 1.25 tons, 2.5 tons, 3.75 tons and 5 tons respectively, and the corresponding vertical stresses are 50 kpa, 100 kpa, 150 kpa and 200 kpa. 3-5 test samples should be prepared for each group of tests and tested under given pressure.

A bracket of the displacement meter 10 is mounted: the displacement meter 10 is placed at the other end of each shear box 7 with no jack 8 mounted in the horizontal direction, a fixed end of the bracket of displacement meter 10 is placed outside a deformation influence range, and the displacement meter 10 is mounted on the bracket by means of a magnetic gauge stand. The displacement meter 10 moves slowly, and stops until the displacement meter makes contact with the shear box 7.

S40, perform an in-situ direct shear test:
acquire data of the jacks 8 and the displacement meters 10 by means of an acquisition instrument, and form a curve related to a shearing force and displacement;
keep a shear rate constant, when shear deformation increases sharply or the amount of shear deformation reaches $1/10$ of a size of a test body in each shear box 7, determine that the rock-soil body is damaged, stop the test, and save test data;
repeat the test, and mount the counterweights 12 with different weights, to obtain a plurality of groups of different vertical stress-shear stress distributions; and
fit a shear strength envelope of the rock-soil body according to the Mohr-Coulomb theory, so as to obtain a shear strength parameter.

In the embodiment, after on-site test apparatuses are mounted, the displacement meter is connected to the acquisition instrument by means of a displacement sensor cable 11, and the horizontal jack 8 is connected to the acquisition instrument by means of a pressure sensor cable 11. The acquisition instrument can acquire data to form a shear force and displacement curve during a test. A shear rate is kept constant, when shear deformation increases sharply or the amount of shear deformation reaches $1/10$ of a size of a test body, it is determined that the rock-soil body is damaged, the test stops, and test data is saved.

The above steps are repeated, and different counterweights are applied to obtain a plurality of groups of "different vertical stress-shear stress" distributions. A shear strength envelope of the rock-soil body is fitted according to the Mohr-Coulomb theory, to obtain the shear strength parameters. A slope is an internal friction angle φ in the shear strength parameters, and an intercept is a cohesive force C in the shear strength parameters.

S50, sum the shear strength parameters of all the shear boxes 7, to obtain a dry-wet cycle number-shear strength parameter relation curve with the number of dry-wet cycles as an abscissa and an shear strength index as an ordinate.

Figure 7:
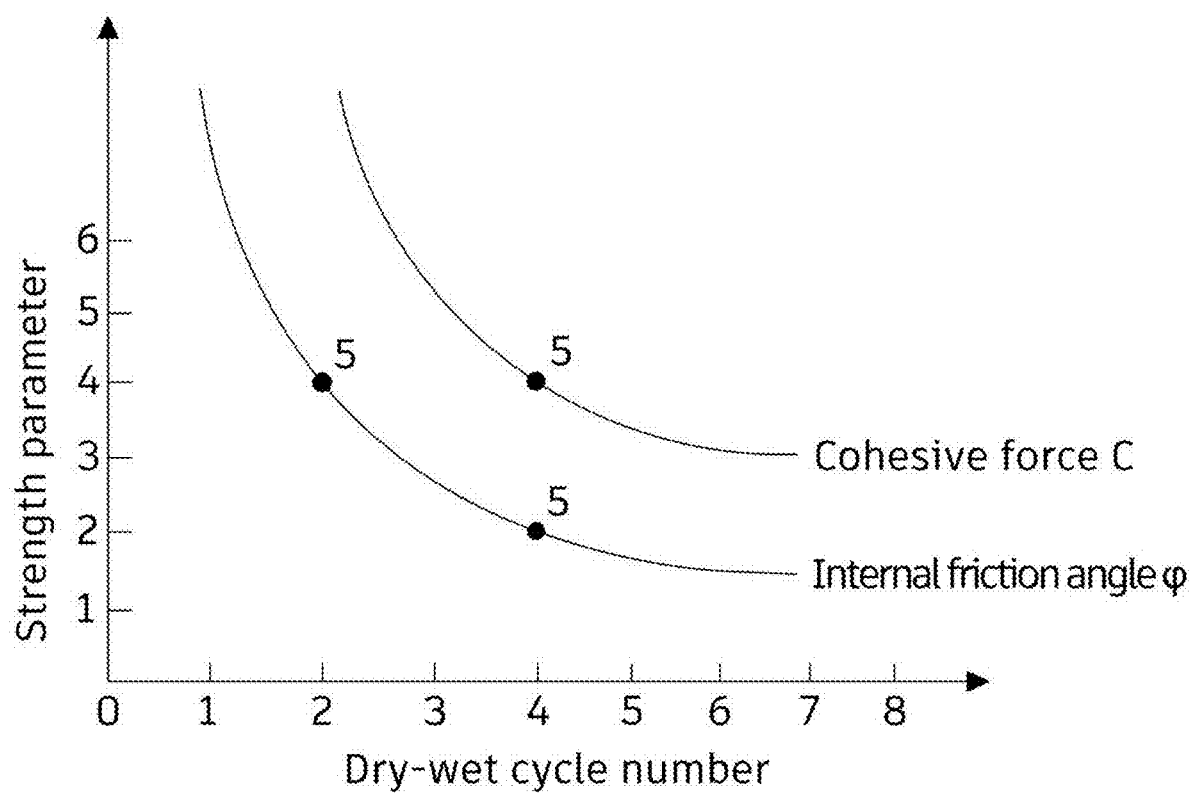
FIG. 7 is a schematic diagram of a "dry-wet cycle number-shear strength parameter" relation curve.

As shown in FIG. 7, a deterioration condition of the strength parameter of the large-grain-size filler during long-term operation is estimated. For example, A represents the number of dry-wet cycles being 2, and the strength parameter being 4.

Parts not described in detail in the present application are prior art, and thus are not described in detail in the present application.

It can be understood that the term "a" or "an" should be interpreted as "at least one" or "one or more", that is, in one embodiment, the number of an element may be one, while in other embodiments, the number of the element may be more, and the term "a" or "an" should not be interpreted as a limitation on the number.

Although the terms of steel plate 1, water permeable hole 2, water hose 3, water valve 4, air blower 5, canopy 6, shear box 7, jack 8, bearing steel plate 9, displacement meter 10, cable 11, counterweight 12, steel base plate 13, test tank 14, etc. are often used herein, the possibility of using other terms is not excluded. These terms are only used for more convenient description and explanation of the essence of the present application. It would be contrary to the spirit of the present application to interpret them as any additional limitation.

The present application is not limited to the optimal implementation described above, and other various forms of products may be derived by anyone under the inspiration of the present application, however, no matter what the shapes or structures are changed, the same or similar technical solution of the present invention is within the scope of protection of the present application.

What is claimed is:

1. A test structure for implementing an on-site dry-wet cycle of a large-grain-size rock-soil body, applied to an on-site dry-wet cycle test and a direct shear test of the rock-soil body with a maximum grain size greater than 60 mm, and comprising:
a test site evenly paved with a test material;
a test tank arranged in the test site, wherein two ends of each test tank in a width direction are separated from a soil body of the test site by steel plates, and each test tank is provided with a plurality of water permeable holes;
a spraying mechanism arranged on each test tank and configured to uniformly spray the test tank;
a canopy erected above each test tank, wherein each canopy is provided with an air blower for blowing and drying the test tank;
a shear box embedded into a soil body of each test tank under static pressure, wherein a top of each shear box is flush with a surface of the soil body of the test site, and a soil body around the shear box is hollowed out to form a concentric-square-shaped pit;
a jack arranged on one lateral surface of each shear box and configured to apply a horizontal shear force, wherein a bearing steel plate is arranged at one end of the jack away from the shear box;
a displacement meter arranged on the other lateral surface of each shear box with no jack mounted, and configured to measure displacement of the shear box; and
a counterweight arranged at a top of each shear box and used for counterweight;
wherein the spraying mechanism comprises a plurality of water hoses erected above all the test tanks, the water hoses are uniformly spaced in the width direction of the test tanks and parallel to the test tanks, and a plurality of nozzles are uniformly spaced in a length direction of each water hose.

2. The test structure for implementing an on-site dry-wet cycle of a large-grain-size rock-soil body according to claim 1, wherein the top of each shear box is provided with a steel base plate, and the steel base plate is configured to accommodate the counterweight.

3. The test structure for implementing an on-site dry-wet cycle of a large-grain-size rock-soil body according to claim 1, wherein the steel plates are inserted into the test site by at least 50 cm and are at least 20 cm higher than the test site.

4. The test structure for implementing an on-site dry-wet cycle of a large-grain-size rock-soil body according to claim 1, wherein the water permeable holes are arranged on two sides of each water hose in a staggered manner.

5. The test structure for implementing an on-site dry-wet cycle of a large-grain-size rock-soil body according to claim 1, wherein each shear box is a hollow box hollowed from top to bottom and having a bladed lower end.

6. The test structure for implementing an on-site dry-wet cycle of a large-grain-size rock-soil body according to claim 1, wherein each shear box is placed on a center line of two adjacent water permeable holes on the left and right.

7. A test method for implementing an on-site dry-wet cycle of a large-grain-size rock-soil body, comprising:
S00, laying out a site:
transporting a large-grain-size test material to a test ground, and uniformly laying the material by means of an excavator, to form a test site, wherein a size of the site is determined according to the required number of experiments, such that the number of dry-wet cycle conditions corresponds to the number of test tanks;
after the test ground is rolled to required compactness by a road roller, inserting a steel plate, to isolate each test tank in a length direction; and
arranging a water hose on each test tank, connecting pipes, erecting a canopy above each test tank, and mounting an air blower on each canopy;
S10, performing a basic physical property test on the rock-soil body:
sampling a rock-soil body of the test tank to be tested in the test ground; and
weighing and drying the sampled rock-soil body, and weighing the dried rock-soil body again, to compute a saturated water content;
S20, implementing the on-site dry-wet cycle of the rock-soil body:
numbering each test tank, corresponding to the number of dry-wet cycles of each test tank in turn from small to large; and
performing saturation-dewatering cycle operation on all the test tanks simultaneously, wherein
in a test, a rock-soil body sample is saturated by means of sprinkler irrigation until all the rock-soil body samples are in a saturated state, and the rock-soil body samples are dewatered by means of natural air drying or accelerated air drying by an air blower;
S30, setting up an in-situ direct shear test environment:
embedding a shear box into the rock-soil body of each test tank under static pressure until the shear box completely enters the rock-soil body and is flush with an upper surface of the rock-soil body, wherein all the shear boxes are uniformly spaced in the length direction of the test tanks;
excavating a soil body around each shear box, to form a concentric-square-shaped pit by the shear box and the rock-soil body of the test tank;
trimming a surplus soil body off an upper portion of each shear box to keep the soil body flat, and covering a steel base plate;
arranging a jack on one lateral surface of each shear box in a left and right direction, and arranging a bearing steel plate at the other end of the jack;
arranging a counterweight at a top of each shear box; and
arranging a displacement meter on a lateral surface opposite the lateral surface of each shear box with the jack mounted;
S40, performing an in-situ direct shear test:
acquiring data of the jacks and the displacement meters, and forming a curve related to a shearing force and displacement;
keeping a shear rate constant, when shear deformation increases sharply or the amount of shear deformation reaches $1/10$ of a size of a test body in each shear box, determining that the rock-soil body is damaged, stopping the test, and saving test data;
repeating the test, and mounting the counterweights with different weights, to obtain a plurality of groups of different vertical stress-shear stress distributions; and
fitting a shear strength envelope of the rock-soil body according to the Mohr-Coulomb theory, so as to obtain a shear strength parameter; and
S50, summing the shear strength parameters of all the shear boxes, to obtain a dry-wet cycle number-shear strength parameter relation curve with the number of dry-wet cycles as an abscissa and an shear strength index as an ordinate;
wherein in S20, a test point is set at every set distance in the length direction of each test tank, soil samples at a set depth from a surface are taken in real time every day, a water content is measured through a drying method, and when the water content reaches 80% of the saturated water content, the samples are saturated, a saturation process is ended, and water valves of the water hoses are closed to enter a dewatering process.

8. The test method for implementing an on-site dry-wet cycle of a large-grain-size rock-soil body according to claim 7, wherein in S10, specific steps of sampling are as follows:
S11, performing sampling by means of an annular sword, wherein a sampling position is located within 50 cm from edges of two sides of each test tank to the steel plate;
S12, vertically embedding the annular sword into the rock-soil body of each test tank by means of a compaction hammer to a soil sampling depth stably, and guaranteeing that a soil body below is not disturbed; and
S13, taking out the annular sword stably with a pick, removing residual soil at two ends of the annular sword with a soil trimming knife, and wiping an outer wall of the annular sword, so as to obtain the sampled rock-soil body.

* * * * *